United States Patent [19]
Ziu

[11] Patent Number: 5,141,256
[45] Date of Patent: Aug. 25, 1992

[54] DOUBLE CONTAINMENT PIPE ASSEMBLY ACCESS HOUSING

[75] Inventor: Christopher G. Ziu, Somerville, Mass.

[73] Assignee: Double Containment Systems, Monroe, Conn.

[21] Appl. No.: 721,189

[22] Filed: Jun. 26, 1991

[51] Int. Cl.⁵ .............................................. F16L 39/00
[52] U.S. Cl. ..................................... 285/13; 285/121; 285/16
[58] Field of Search ...................... 285/13, 14, 16, 121, 285/901, 133.1

[56]  References Cited

U.S. PATENT DOCUMENTS

| | | | |
|---|---|---|---|
| 316,967 | 5/1885 | Heber | 285/13 |
| 1,104,395 | 7/1914 | Vibber | 285/121 |
| 1,497,652 | 6/1924 | Browne | 285/13 |
| 2,423,574 | 7/1947 | Barrett | 285/121 |
| 2,610,028 | 9/1952 | Smith | 285/14 |
| 3,039,275 | 6/1962 | Lacaze et al. | 285/121 |
| 3,156,490 | 11/1964 | Myll | 285/121 |
| 3,377,087 | 4/1968 | Samerdyke et al. | 285/14 |
| 3,698,194 | 10/1972 | Flynn | 61/11 |
| 3,948,315 | 4/1970 | Powell | 285/14 |
| 4,121,858 | 10/1978 | Schulz | 285/13 |
| 4,925,218 | 5/1990 | Kunz et al. | 285/93 |
| 4,932,257 | 6/1990 | Webb | 285/93 |
| 4,934,744 | 6/1990 | Samera, Jr. et al. | 285/14 |
| 4,971,477 | 11/1990 | Webb et al. | 405/154 |

FOREIGN PATENT DOCUMENTS

| | | | |
|---|---|---|---|
| 1192650 | 5/1970 | United Kingdom | 285/93 |
| 1567373 | 5/1980 | United Kingdom | 285/904 |

*Primary Examiner*—Eric K. Nicholson
*Attorney, Agent, or Firm*—Kramer, Brufsky & Cifelli

[57]  ABSTRACT

An access housing is provided between segments of an outer containment pipe of a double containment pipe assembly through which the flanged ends of a primary pipe may be accessed with the ability to readily assemble and disassemble the inner piping system in modular sections.

17 Claims, 5 Drawing Sheets

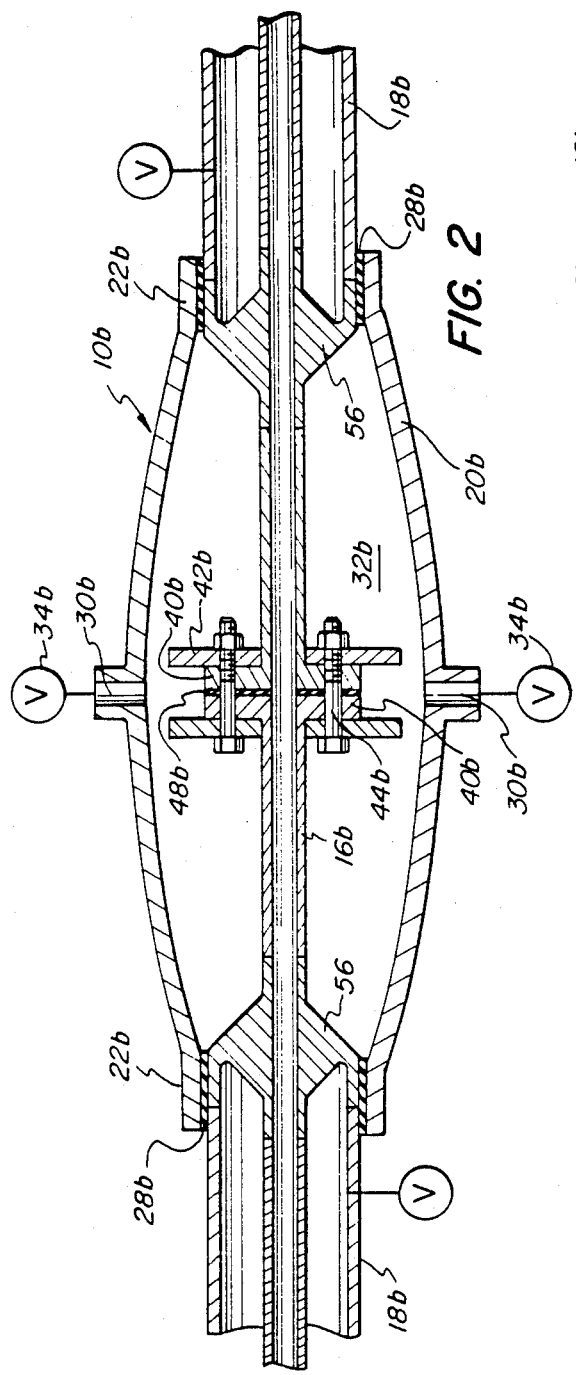
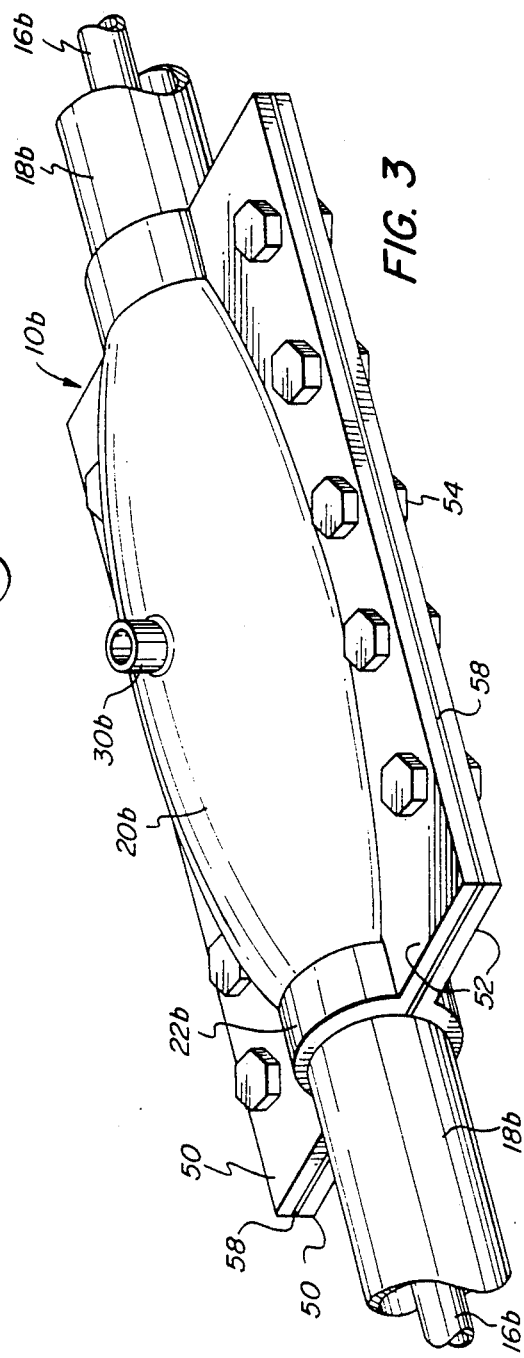

DOUBLE CONTAINMENT PIPE ASSEMBLY ACCESS HOUSING

BACKGROUND OF THE INVENTION

1. Field of the Invention

This invention relates to a double containment pipe assembly for conveying fluids and, more particularly, a housing for use in the system which enables ready assembly and disassembly of the system in modular sections.

2. Description of the Prior Art

This invention has particular utility in the conveyance of hazardous or toxic fluids such as are often found in heavy industrial facilities. However, while the invention has particular application to the conveyance of hazardous or toxic fluids, it can be used with any type of fluid and many types of gases which must be conveyed in quantity from one place to another.

Hazardous fluids cannot be routinely conveyed in open top drainage channels, but instead in enclosed pipe or conduits. Recognizing that such pipes and conduits can leak because of manufacturing defects, excessive pressure, corrosion or other reasons, prior art double containment systems generally involve the placement of a relatively small fluid carrying closed-wall conduit within a larger closed-wall conduit which does not carry fluids except in the event of a leak of liquid carried by the inner conduit. The smaller conduit is supported by resting directly on the lower, inner wall of the outer conduit, or by use of a centering device that is positioned between the inner and outer conduits.

While the above-described system will perform adequately to prevent leakage of hazardous fluids into the environment from the inner conduit, repairing the leak in the inner conduit is expensive and time consuming. In many cases, the inner and outer conduits are hundreds of feet long and are formed either of seamless extruded conduit or conduit formed of relatively long segments. Since both conduits are closed-wall, the outer conduit must be penetrated to determine the location of the leak in the inner conduit. In some cases, the inner conduit must be disconnected and physically removed from the outer conduit. In other instances, the outer conduit must be penetrated at intervals along its length to determine the position of the leak. Even then, further damage to the outer conduit must take place in order to remove and/or repair the inner conduit and return it to use.

The invention described in this application provides all of the safety and security of a double wall containment system formed of inner and outer closed-wall conduits, while permitting easy access to the inner conduit to determine the location of a leak for repair, and the removal of the inner conduit section to repair the leak.

SUMMARY OF THE INVENTION

In accordance with the invention, an access housing is provided between segments of the outer containment pipe of a double containment pipe assembly through which the flanged ends of a primary pipe may be accessed with the ability to readily assemble and disassemble the double containment piping system on either side of the housing in modular sections. Since the housing is a "flanged"/"bolted" arrangement, it is most useful in above ground applications, since it is usually not a good engineering practice to bury a flange or other bolted connection.

All forms of the invention may be used to "house" or "contain" a flange or union that is attached to the primary system. However, all forms of the invention may also be used to "house" or "contain" a valve, expansion joint, or other mechanical piping accessory that requires ready access or frequent maintenance or sensing equipment to determine the need for maintenance.

There are four embodiments of the invention which are disclosed. The first includes a housing design which is designed to be able to withstand significant internal pressures. For some applications, it may be designed to match the same pressure rating as the internal piping system. The second version of the housing is intended to house a double-termination end flange arrangement, with limited pressure retaining capability. In this type of arrangement, the double containment piping system would be terminated on both sides, with the use of a pipe fitting disclosed in my copending application Ser. No. 681,331, filed Apr. 4, 1991, or by the use of an equivalent fabricated arrangement.

The third and fourth embodiments also represent possible ways to fabricate an access housing that would allow for significant pressure retaining capabilities of the outer housing. Furthermore, the third embodiment is unique in that it would allow the inner and outer piping systems to be flanged in the same plane for easier disassembly and assembly of the components.

All forms of the invention, however, relate to an access housing for a double containment piping system which enable the system to be readily assembled and disassembled in modular sections with secondary containment provided at 100% of all points in the system and allows for ready use of a compartmentalized leak detection design, with manual, visual and automatic sensors.

BRIEF DESCRIPTION OF THE DRAWINGS

Further objects and advantages of the invention will become more apparent from the following description and claims, and from the accompanying drawings, wherein:

FIG. 2 is a longitudinal cross-sectional view through another form of the double containment pipe assembly access housing of the present invention;

FIG. 3 is a perspective view of the access housing of FIG. 2;

DETAILED DESCRIPTION OF THE PREFERRED EMBODIMENT

Figure 1:
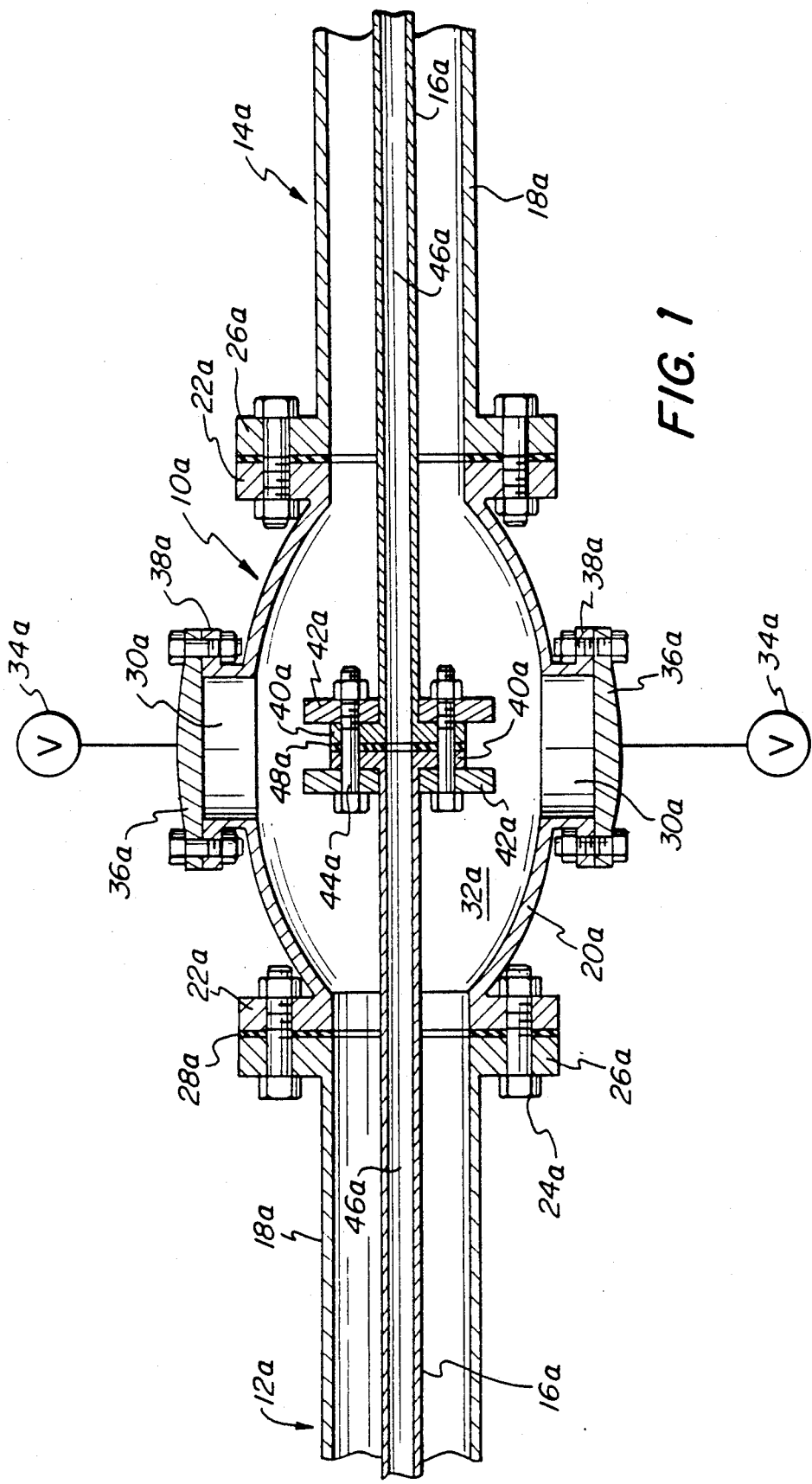
FIG. 1 is a longitudinal cross-sectional view through one form of a double containment pipe assembly access housing in accordance with the present invention.

Referring now to the drawings in detail, wherein like numerals indicate like elements throughout the several views, one form of the access housing of the present invention is illustrated in FIG. 1 by the numeral 10a and is positioned between sections 12a and 14a of a double containment pipe assembly consisting of an inner pipe 16a for conveying a fluid and an outer or containment pipe 18a used to contain the fluid if a leak occurs in the primary pipe 16a.

The main part or casing 20a of the housing 10a may be manufactured from a metallic material, reinforced thermosetting plastic material, thermoplastic material, borosilicate glass, or other applicable material, and has an elliptical or ovular shape in cross-section. The casing 20a would typically be designed in a pressure rated fashion, with all thickness determined according to the rules of the ASME Boiler and Pressure Vessel Code, if applicable. As shown in FIG. 1, the casing 20a is one piece and defines a longitudinal axis substantially coaxial with the primary pipes 16a and containment pipes 18a.

A flange 22a is attached to both ends of the casing 20a, which is bolted by bolts 24a to a similarly dimensioned flange 26a on the secondary containment (outer) pipe 18a used in adjoining sections of the system. A gasket 28a is used between the flanges 22a,26a as required.

An access port 30a is placed at two or more positions around the body of the casing 20a. If two are used, one is positioned at the 12 o'clock position, and the other at the 6 o'clock position. It is best to have one port positioned at the 12 o'clock position, and one at the 6 o'clock position so that the compartment 32a within casing 20a can be readily drained and vented through a valve 34a. If desired, three or four ports may also be used. If three ports are used, then special attention must be paid to the design to insure that all low points and high points may be drained and vented, respectively. If needed, an additional drain/vent valve may need to be installed at the isolated position.

The size of any one port opening 30a may vary. The size of the port openings 30 should be such that at least one of the ports allows whatever needs to be removed on the inside to be removed (e.g., valve, split flange ring, gasket, etc.). Each opening must take into account the need for socket wrenches and torque wrenches to be used to allow the inner assembly to be readily assembled and bolted, and allow it to be subsequently unbolted and disassembled. Thus, the size relationships selected may vary, but they are all related due to the needs described above.

A cover 36a is bolted to a flange 38a on casing 20a to close the openings 30a and must be designed to withstand the design internal pressure of the secondary containment pipe 18a. The design of the cover 36a, including its shape and thicknesses, depends on standard design rules of the ASME Boiler and Pressure Vessel Code. Typically, the design depends on the pressure required, the size of the opening 30a, and the strength of the material being used.

The valves 34a should be attached to a nozzle or opening that is designed as an integral part of cover 36a. The valves may be attached by welding or bonding to the nozzle/opening, or by a flanged or threaded attachment. The attached valves 34a may then be used for draining and venting purposes, and as a manual means of leak detection.

The main purpose of the access housing 10a is to allow both inner pipe 16a and outer pipe 18a to be connected by bolted arrangements for rapid assembly and disassembly, and the removal of sections thereof for repair/maintenance as the need arises without the need of replacing the entire inner or outer pipe systems. Therefore, an end of the inner piping components 16a to be housed is provided with abutting flanges 40a. A split backing ring 42a surrounds each inner pipe section 16a in front of its end flange 40a and receives bolts 44a therebetween and through end flanges 40a to secure pipe sections 16a together, with their bores 46a aligned. A gasket 48a is used where required between the flanges 40a.

Upon removal of either cover 36a, access through port 30a can be provided to uncouple and couple inner pipes 16a. The outer containment pipes 18a can be coupled and uncoupled to remove sections 12a,14a . . . , from a position exterior of housing 10a. As also shown in FIG. 1, each flange 22a defines and opening which is larger in diameter than each flange 40a to receive through the opening a respective flange for facilitating insertion and removal of the inner pipes 16a.

A second form of the access housing of the present invention is illustrated in FIGS. 2 and 3 by the numeral 10b. Similar parts to the housing 10a are indicated by similar numerals succeeded by the letter b.

The part or casing 20b of housing 10b can be constructed of any material that is used for typical piping use (i.e., metallic, reinforced thermosetting plastic, thermoplastic, borosilicate glass, etc.). The shape of the casing 20b may vary and may include such shapes as cylindrical, spherical, ellipsoidal (as shown), square, and others. In any event, the portion 22b of casing 20b which includes a seal 28b along the mating area of the secondary containment pipe 18b interface should closely match the shape of the secondary containment pipe 18b. The rest of the casing 20b may be of a completely different geometry than the end portion 22b.

In all cases, the casing 20b is a two-piece, symmetrical part having lateral flanges 50,52 on each part that may be bolted together by bolts 54 to form a complete encasement of the internal parts, i.e., primary pipe 16b, primary/secondary pipe coupling or fitting 56, and valves 34b, abutting end flanges 40b of inner pipes 16b, split backing ring 42b, bolts 44b and gasket 48b, whose function is identical to that described in conjunction with housing 10a of FIG. 1. Pipe coupling or fitting 56 is a termination fitting for the outer pipe 18b of the type disclosed in detail in my copending application Ser. No. 681,331 filed Apr. 4, 1991, entitled "Double Containment Pipe Joint Assembly", which disclosure is incorporated herein by reference. The main or primary pipe 16b is welded to a flange of the fitting near the inner bore of the fitting 56, while the outer containment pipe 18b is welded to an outer concentric flange of the fitting.

There are two significant advantages of the design of housing 10b over that of housing 10a. First, the casing 20b, being formed in two mirror-image parts, may be assembled over the primary piping 16b and associated parts in the field, after the primary parts have been bolted and pressure tested, thereby making visual observation of the primary bolted connections easier. Secondly, because of its symmetrical construction, the casing 20b can be more economically manufactured due to its significantly reduced size, and less complex geometry. On the down side, it is very difficult to design the two-part casing 20b to allow a significant pressure retaining capability. However, a high pressure rating is not always necessary for this section of the secondary containment, depending on owner preferences and leak detection methods as well as operational controls which are used.

A symmetrical gasket 58 can be used to line the space between each half of the casing 20b. Therefore, when the units are bolted together, a longitudinal seal will be effected by compressing the symmetrical gaskets 58 against each other. The gaskets 58 can have matching raised-ribs/grooves along their longitudinal surfaces.

A nipple, threaded connection, or branch outlet 30b is provided so that a drain/vent valve 34b or leak detection header (not shown) can be provided to monitor the interior of the casing 20b.

Figure 4:
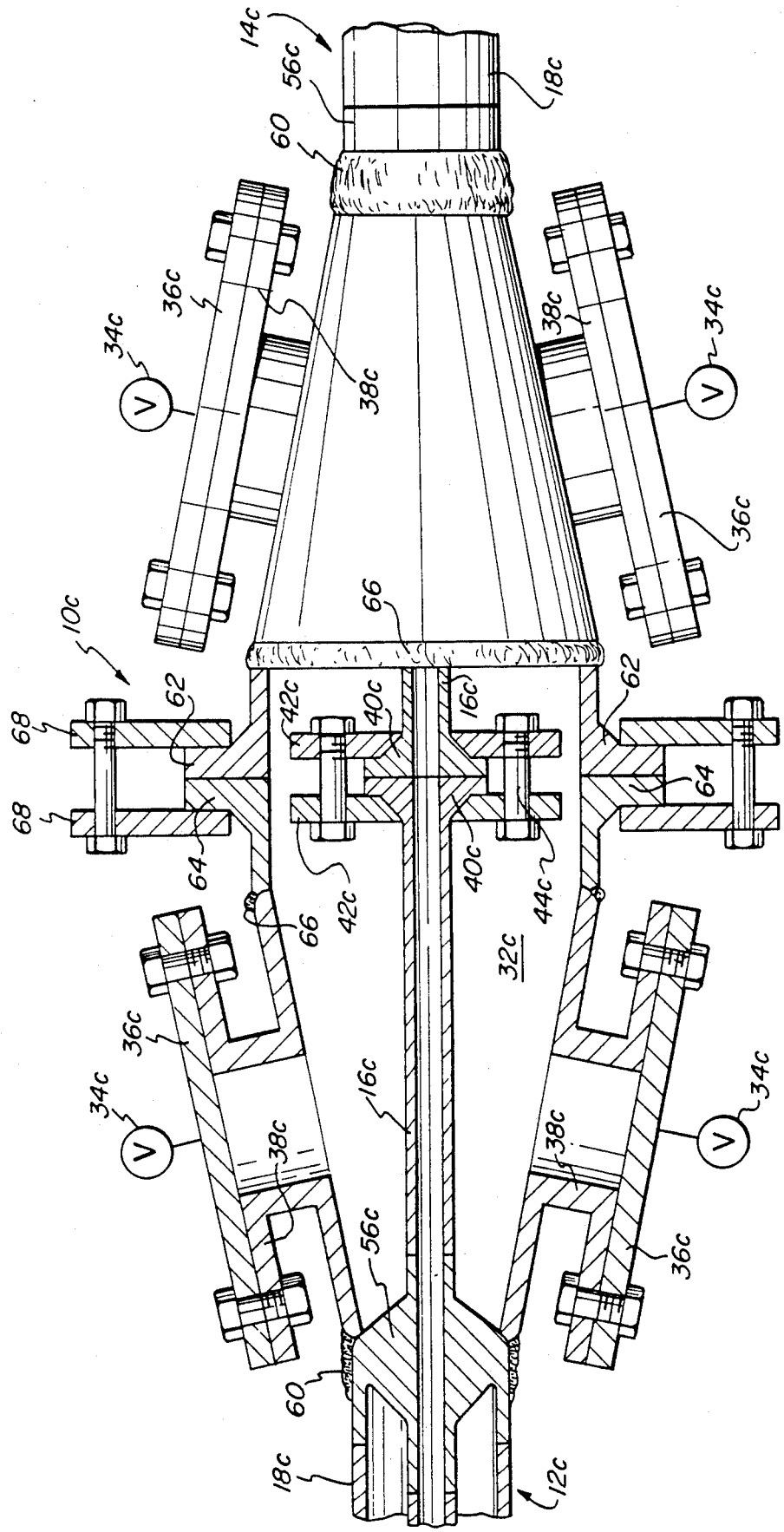
FIG. 4 is a partial, longitudinal cross-sectional view of still another form of the double containment pipe assembly access housing of the present invention.
Figure 5:
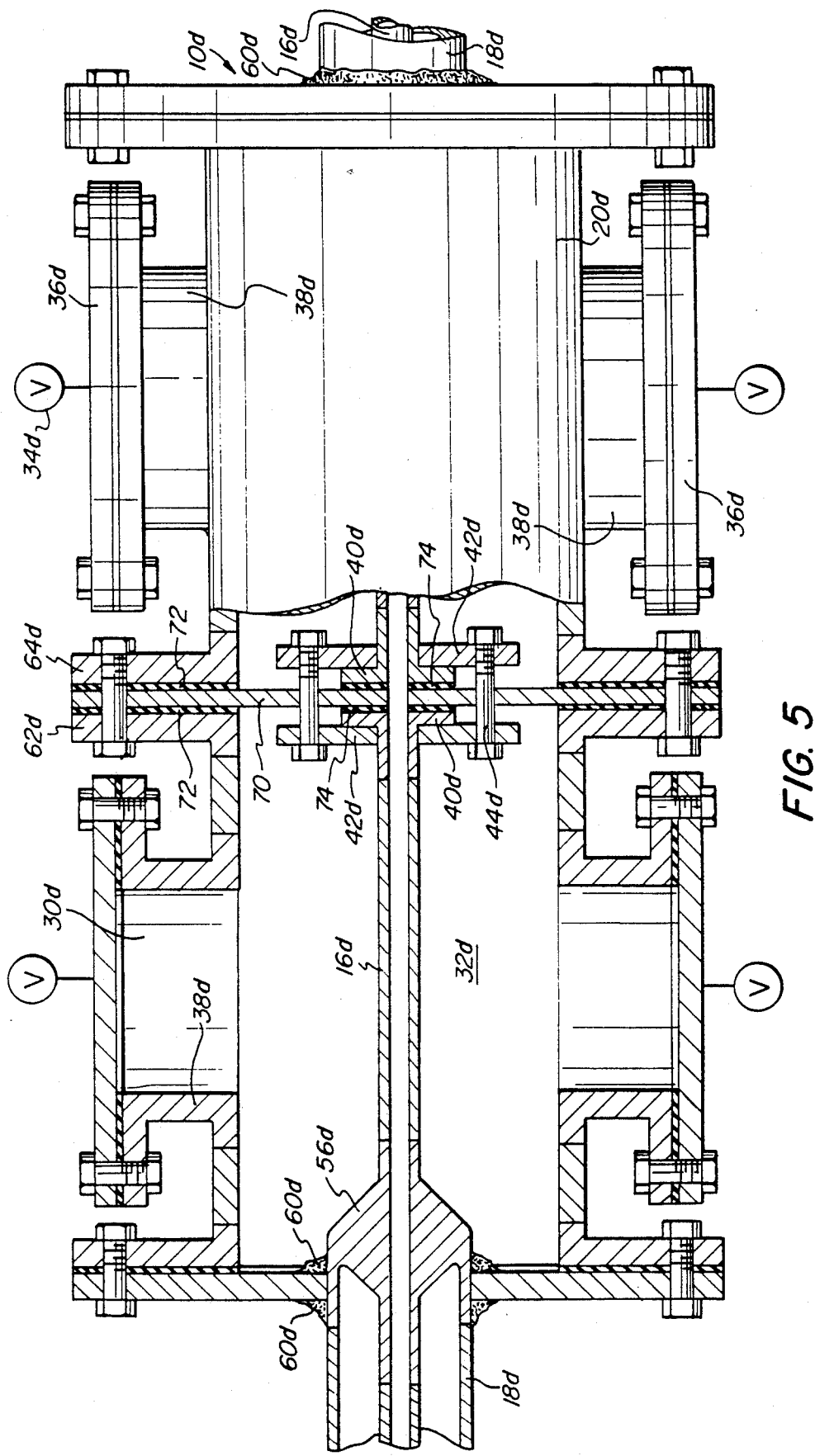
FIG. 5 is a partial, longitudinal cross-sectional view of a form of double containment pipe assembly access housing similar to, but containing additional features than, the access housing of FIG. 4.

FIGS. 4 and 5 illustrate yet another two forms of the invention, although similar to each other. Similar elements to that found in access housing 10a and 10b are indicated by identical numerals followed by the letters c and d, respectively.

A housing 10c (FIG. 4) is provided which is formed from the same material of construction as the secondary containment pipe 18c and includes a conical casing 20c. A fillet weld 60 is shown as the means of attaching the casing 20c of the housing 10c to the termination fitting 56c. Casing 20c can also be directly welded to a straight pipe section of the outer pipe 18c where no termination fitting is used. It can also be directly welded or bonded to an outlet branch on the termination fitting 56c, if the termination fitting is constructed with such a branch.

Multiple access flanges 38c are fabricated into the body of the casing 20c in order to provide access to the interior 32c. The number used can vary. However, two on each side of the body of casing 20c are shown as a likely number to be used. Each access flange 38c is welded or bonded to the casing 20c. It may or may not require additional reinforcement, depending on pressure calculations. A cover 36c or other top is secured by bolts to each access flange 38c. A gasket (not shown) may be used between cover 36c and access flange 38c to effect a seal by compression. A drain/vent valve 34c or other leak detection header may be added to the cover 36c.

Abutting flanges 62,64 are used to connect each half of casing 20c which serve as a means of disassembling the secondary containment piping sections 12c and 14c. The flanges 62,64 are welded or bonded at opposite portions of casing 20c. A solid or split backing ring clamp 68 may be used to hold the abutting flanges 62,64 together.

The coupling of the primary pipes 16c within casing 20c of housing 10c is essentially the same as the coupling of pipes 16a (FIG. 1) and 16b (FIG. 2). A straight section of primary piping 16c is provided with a primary pipe flange 40c which is abutted with a like flange 40c on an adjacent primary pipe. A backing ring 42c receives bolts 44c therethrough to clamp the flanges 40c. A gasket (not shown) may be used to effect the seal between the abutting flanges 40c.

A further option could entail the use of a common bolt plate (not shown) that is drilled with both the primary and secondary flanges 40c and 62,64, respectively, and is disposed between the flanges for the entire diameter of casing 20c. Both the primary and secondary containment flanges may be bolted to the common bolt plate. This would serve to support the primary pipe flange 40c so no deformation on the primary components occurs, due to the weight of the relatively unsupported inner flange. It also would divide the containment zone 32c into two compartments, thereby limiting a leak to one side. When this option is selected, gaskets should be sued on both sides of the common plate for both the primary and secondary flanges.

The housing 10d (FIG. 5) includes a casing 20d which is substantially identical to casing 20c, like numerals designating identical elements. However, the common bolt plate 70 between the outer containment casing flanges 62d,64d and the inner pipe flanges 40d is provided along with appropriate gaskets 72,74 to split the space 32d into two compartments to contain a leak. The casing 20d is also substantially cylindrical in shape, and a fillet weld 60d is used to connect the termination fitting 56d to casing 20d.

Figure 6:
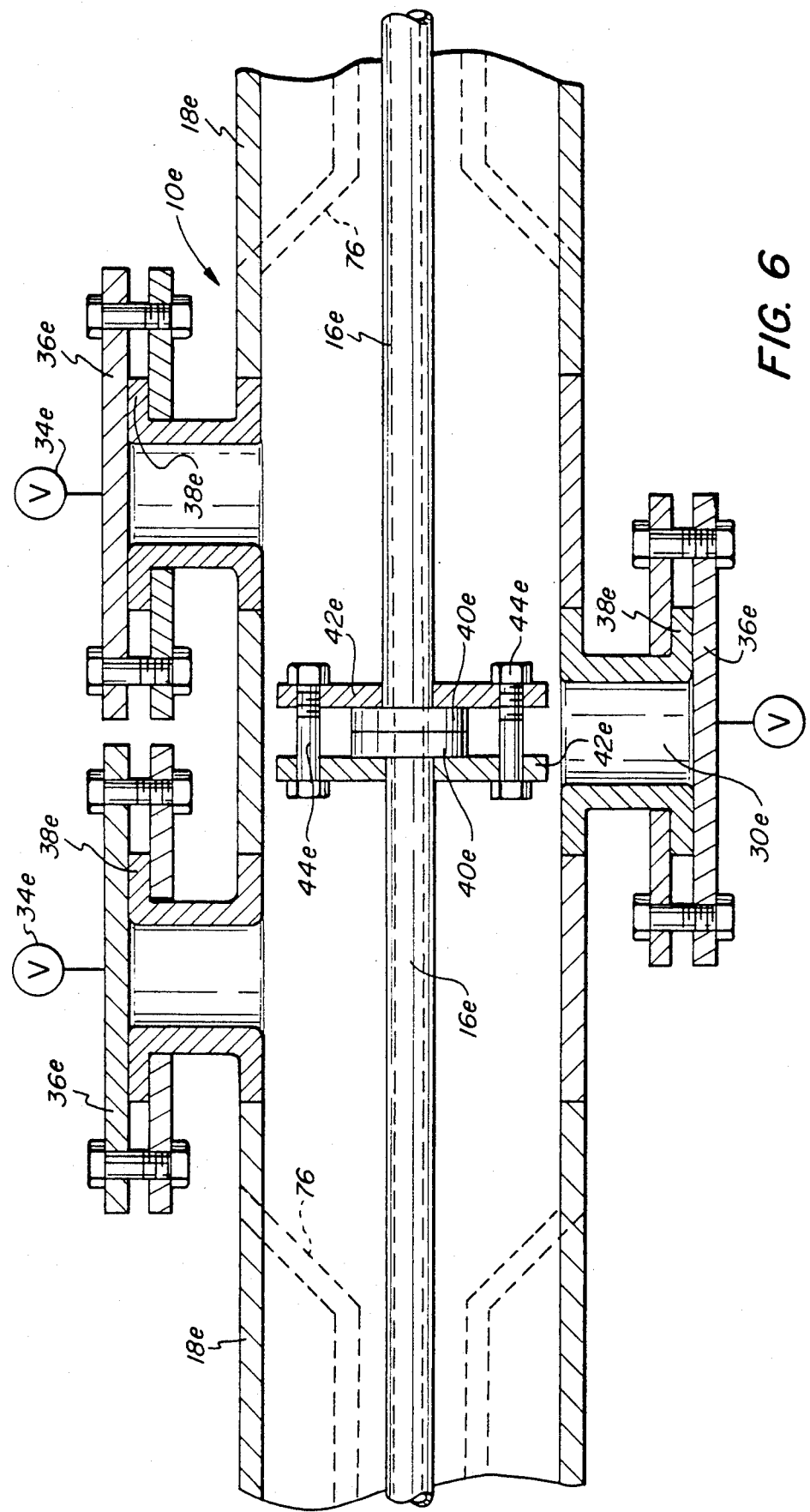
FIG. 6 is a longitudinal cross-sectional view of yet another form of the double containment pipe assembly access housing of the present invention.

An access housing 10e (FIG. 6) can be formed using a straight piece of the outer containment pipe 18e with an inside diameter at least that of the outside dimension of a primary piping flange 40e. Similar elements to those of the housings 10a-10d, inclusive, are indicated by the same numerals. A concentric reducer 76 might be added as indicated by the dotted lines, so that a smaller diameter secondary containment pipe 18e can be used between the coupling locations.

Multiple ports 30e formed by T-flanges 38e welded at spaced locations along the containment pipe 18e and provided with covers 36e bolted to clamps for the covers provide access for assembling and disassembling the primary piping 16e. The number of ports 30e used can vary. A gasket be used between the covers 36e and flange 38e (see, e.g., FIG. 5) to effect a seal by compression.

What is claimed is:

1. A double containment pipe assembly, comprising:
   at least two outer containment pipes, each outer pipe including a first flange on one end of the pipe;
   at least two inner pipes contained within the outer pipes, each inner pipe including a second flange on one end for coupling the ends of the two inner pipes together, each second flange having a diameter larger than the outer diameter of the respective inner pipe; and
   an access housing including a one-piece casing defining a longitudinal axis substantially coaxial with the outer and inner pipes and a pair of spaced ends, the casing including a third flange on each end for coupling each end to a first flange of a respective outer containment pipe, each end of the casing defining an end opening substantially coaxial with the longitudinal axis and dimensioned to receive through the end opening the second flange of a respective inner pipe for coupling the second flanges to each other within the casing and for facilitating removal of each inner pipe through the end opening for repair or replacement, the casing further including an access port for repair and maintenance of the inner pipes through the access port.

2. A double containment pipe assembly as defined in claim 1, wherein the access port is dimensioned to permit removal through the port a component selected from the group including a valve, a split ring flange and a gasket.

3. A double containment pipe assembly as defined in claim 1, wherein the casing further includes a second access port located on a substantially opposite side of the casing relative to the first access port.

4. A double containment pipe assembly as defined in claim 1, further comprising at least one valve coupled to the casing through the access port for at least one of draining the casing, venting the casing, and leak detection.

5. A double containment pipe assembly, comprising:
at least two outer containment pipes;
at least two first inner pipes contained within the outer pipes;
an access housing including a casing formed with two parts, the two parts being coupled together to form an enclosure and defining spaced ends on either end of the casing;
two termination fittings, each termination fitting being coupled to a respective end of the casing, coupled to a respective inner pipe for coupling the inner pipe to the access housing, and coupled to a respective outer pipe for coupling the outer pipe to the access housing and terminating the outer pipe; and
at least one second inner pipe contained within the casing and coupled between the two termination fittings.

6. A double containment pipe assembly as defined in claim 5, wherein the casing includes at least one access pot for repair and maintenance of the second inner pipe through the access port.

7. A double containment pipe assembly as defined in claim 6, further comprising at least one valve coupled to the casing through the access port for at least one of draining, venting, and leak detection.

8. A double containment pipe assembly as defined in claim 5, comprising two second inner pipes, each second inner pipe being coupled on one end to a respective termination fitting and coupled on the other end to the other second inner pipe, and two access ports located on opposite sides of the coupling between the two second inner pipes relative to each other for repair and maintenance of the second inner pipes through the two access ports.

9. A double containment pipe assembly as define in claim 8, further comprising a third access port located on a substantially opposite side of the casing relative to at least one of the other two access ports for draining the casing.

10. A double containment pipe assembly as defined in claim 5, comprising two second inner pipes, each second inner pipe including a first flange member on one end for coupling the two second inner pipes together, and further comprising two second flange members, each second flange member being coupled to a respective part of the casing for coupling the two parts of the casing together.

11. A double containment pipe assembly as defined in claim 10, wherein the two first flange members and the two second flange members are each oriented approximately in the same plane for facilitating assembly and disassembly.

12. A double containment pipe assembly, comprising:
at least two outer containment pipes;
at least two inner pipes, each inner pipe including a flange on one end, the inner pips being coupled together by a flanged connection;
an access housing including a casing defining spaced ends for coupling on each end to a respective outer pipe and for receiving through each end a respective inner pipe for coupling the inner pipes by the flanged connection within the casing, and at least three access ports, two access ports being located on opposite sides of the flanged connection of the inner pipes relative to each other for accessing the flanged connection from either side of the connection to facilitate removal and repair of the inner pipes, and the third access port being located on the casing for at least one of draining and venting the casing.

13. A double containment pipe assembly as defined in claim 12, wherein at least one access port is defined by a T-flange.

14. The double containment pipe assembly of claim 5 wherein each casing part includes:
a laterally extending flang adapted to be bolted together.

15. The double containment pipe assembly of claim 5 wherein each part of said casing has an abutting end flange; and
means for clamping said abutting end flanges together.

16. The housing of claim 15 wherein said last named means includes a split ring clamp.

17. The double containment pipe assembly of claim 14 wherein a divider plate extends between the casing flanges of each casing part to divide said casing into two containment compartments.

* * * * *

UNITED STATES PATENT AND TRADEMARK OFFICE
CERTIFICATE OF CORRECTION

PATENT NO. : 5,141,256
DATED : August 25, 1992
INVENTOR(S) : Christopher G. Ziu

It is certified that error appears in the above-identified patent and that said Letters Patent is hereby corrected as shown below:

In column 4, line 15, "and" should read -- an --.

In claim 12, column 8, line 13, "pips" should read -- pipes --.

Signed and Sealed this

Twenty-first Day of September, 1993

Attest:

BRUCE LEHMAN

*Attesting Officer*     *Commissioner of Patents and Trademarks*